United States Patent [19]
Fujimori et al.

[11] Patent Number: 5,339,241
[45] Date of Patent: Aug. 16, 1994

[54] METHOD AND SYSTEM FOR CONTROLLING A TRAVELLING BODY SO AS TO MOVE FORWARD ALONG THE PREDETERMINED ROUTE OF THE MOVEMENT OF TRAVELLING BODY

[75] Inventors: Isao Fujimori, Higashi-murayama; Shigeru Matsumori, Tokyo; Takashi Kano, Chofu; Toshio Sumi, Kodaira, all of Japan

[73] Assignee: Kabushiki Kaisha Isekikaihatsu Koki, Tokyo, Japan

[21] Appl. No.: 719,941

[22] Filed: Jun. 24, 1991

[30] Foreign Application Priority Data

Jul. 13, 1990 [JP] Japan ................... 2-184133

[51] Int. Cl.$^5$ .................................... G06F 15/50
[52] U.S. Cl. .................... 364/424.02; 180/167; 318/586
[58] Field of Search ............ 364/424.02, 424.01; 180/167, 168, 169; 318/580, 586, 587

[56] References Cited

U.S. PATENT DOCUMENTS

| | | | |
|---|---|---|---|
| 4,809,175 | 2/1989 | Hosaka et al. | 364/424.01 |
| 4,837,725 | 6/1989 | Yamakawa | 364/807 |
| 4,875,184 | 10/1989 | Yamakawa | 364/807 |
| 5,036,474 | 7/1991 | Bhanu et al. | 364/424.02 X |
| 5,081,585 | 1/1992 | Kurami et al. | 364/424.02 |
| 5,101,351 | 3/1942 | Hattori | 364/424.02 |
| 5,122,957 | 6/1992 | Hattori | 364/424.02 |
| 5,208,750 | 5/1993 | Kurami et al. | 364/424.02 |
| 5,218,542 | 6/1993 | Endo et al. | 364/424.02 |

FOREIGN PATENT DOCUMENTS 57-205698 12/1982 Japan.

*Primary Examiner*—Gary Chin
*Assistant Examiner*—Collin W. Park
*Attorney, Agent, or Firm*—Fitzpatrick, Cella, Harper & Scinto

[57] ABSTRACT

A method and apparatus for controlling a travelling body having a main body and a steering device along a predetermined route includes a plate-shaped indicator disposed perpendicular to an axis of the main body, an optical pointer emitting light of a first color showing the steering direction of the steering device, a laser beam illuminating the indicator with a laser beam spot of a second color, a TV camera monitoring the optical pointer and the laser beam spot on the indicator, a color separator separating image information of the optical pointer and the laser beam spot, an image processing unit computing position data of the optical pointer and the laser beam spot for outputting steering direction information and optical pointer position information, a fuzzy operation unit processing a steering command using the optical pointer position information, and comparator computing a controlling command for operating the steering device by calculating the difference between the steering command and the steering direction information.

6 Claims, 8 Drawing Sheets

METHOD AND SYSTEM FOR CONTROLLING A TRAVELLING BODY SO AS TO MOVE FORWARD ALONG THE PREDETERMINED ROUTE OF THE MOVEMENT OF TRAVELLING BODY

BACKGROUND OF THE INVENTION (1) Field of the Invention

The present invention relates to a method and system for controlling a travelling body so as to move forward along the predetermined route of the movement of the travelling body.

(2) Description of the Prior Art

Examples of a travelling body which should be moved forward along a predetermined route of the movement of the travelling body while a given work is performed, include a shield for driving a tunnel, or for laying a water supply pipe or a sewage pipe, an unmanned vehicles, and the like.

The aforementioned shield, unmanned vehicles, and the like are generally comprised of a body and a steering means for controlling the direction of movement of the body so as to move forward along the predetermined route.

Particularly, when laying various pipes in the ground by using a shield, the shield encounters a varying intensity of resistance of the soil due to a change in the nature of soil, the presence of groundwater, etc.

Because of this, according to circumstances, even if a shield is driven by uniform power, the shield is moved in the direction of less resistance off the predetermined route. In such a case, an operator measures with the eye the quantity and direction of deviation of the shield from the predetermined route resulting from the movement of shield in the ground, and makes the needed correction in the direction of the shield by controlling the steering means according to the quantity and direction of deviation of the shield from the predetermined route.

Now, the steering means of the shield is concretely explained.

For example, the shield developed by the present applicant and described in Japanese Patent Laying-open No. 57-205698 is comprised of a tail part and a head part positioned on the front end of the tail part which are connected with each other. A graduated plate is fixedly mounted on the fixed location of the aforementioned tail part. A pointer is arranged on the head part, which pointer faces the graduated plates, and can move as the head part is deflected with respect to the tail part. An image of the aforementioned graduated plate is monitored by a TV-camera and shown on a display of a monitor TV.

Further, a visible ray having such a straight travelling property as that of laser beam, etc., as a reference ray is sent along the predetermined route (a direction of excavation or a pipe-laying direction). This visible ray is projected on the graduated plate, while an operator measures with his eye the first position of the visible ray on the graduated plate when starting the excavation, and then the operator measures with his eye the difference between the first position of the visible ray when starting the excavation and the second position of the visible ray after moving forward the shield through some length and the change in the direction of the shield, and adjusts the travelling direction of the shield by driving the jacks according to the measured difference between the first position of the visible ray when starting the excavation and the second position of the visible ray after moving forward the shield through some length.

As above-mentioned, the operation of the shield is largely dependent on the experience and perception of operator, and therefore an operator is required to have high skill. Accordingly, a shield which can be readily operated is required.

SUMMARY OF THE INVENTION

An object of the present invention is to provide a method for automatically controlling a travelling body such as a shield which should be moved forward along a predetermined route while a given work is performed.

An another object of the present invention is to provide a system for automatically controlling a travelling body such as a shield which should be moved forward along the predetermined route while a given work is performed.

The first object is accomplished by a method for controlling a travelling body provided with a body and a steering means along a predetermined route comprising the steps of:

measuring a distance between the body and the predetermined route and a direction of deviation of the body from the predetermined route;

inputting as an observed value the above measured distance between the body and the predetermined route into an antecedent operation part in which membership functions corresponding to distances between the body and the predetermined route are prestored, and performing a grading operation on the antecedent operation part based on the above measured distance between the body and the predetermined route;

inputting the obtained grade into a consequent operation part in which membership functions corresponding to manipulated values are prestored, and performing an operation having a manipulated value on the consequent operation part based on a grade outputted from the antecedent operation part; and outputting the obtained manipulated value into the steering means, the steering means being controlled according to the manipulated value.

According to the present invention, when the travelling body has deviated from the predetermined route body, the travelling body can be controlled along the predetermined route by measuring the quantity and direction of deviation of the travelling from the predetermined route, performing an operation of a manipulated value based on the measured quantity of deviation of the travelling body from the predetermined route, and controlling the steering means according to the manipulated value and the direction of deviation.

That is to say, an effective operation based on the observed value of the antecedent operation part can be performed by predetermining the membership functions in the antecedent operation part according to data corresponding to quantities of deviation of the travelling body from the predetermined route and utilizing accumulated data representing the steering technique of a number of veteran operators, predetermining the membership functions of the consequent operation part according to data corresponding to manipulated values based on the quantities of deviation of the travelling body from the predetermined route, measuring the quantity of deviation of the travelling body from the predetermined route resulting from the progress of the travelling body, and inputting as an observed value the measured quantity of deviation of the travelling body from the predetermined route into the antecedent operation part. Then, an operation of manipulated value based on the observed value, namely the quantity of deviation of the travelling body from the predetermined route can be performed by reducing the membership functions at the consequent operation part according to the grade, and combining the reduced membership functions. The manipulated value expresses the value based on the know-how of a number of operators, which is recognized as the most valid manipulated value. Accordingly, the travelling body can be controlled along the predetermined route by driving the steering means based on the manipulated value outputted from the consequent operation part into the steering means.

Further, the first object of the present invention is also accomplished by a method for controlling a travelling body provided with a body and a steering means along the predetermined route comprising the steps of:

measuring a distance between the body and the predetermined route and a direction of deviation of the body from the predetermined route, as well as the quantity and direction of displacement of the steering means relative to the body;

inputting as an observed value the above measured distance between the body and the predetermined route into an antecedent operation part in which the membership functions corresponding to distances between the body and the predetermined route are prestored, and performing a grade operation at the antecedent operation part;

inputting the obtained grade into a consequent operation part in which the membership functions corresponding to manipulated values are prestored, performing an operation on the manipulated value of the consequent operation part, comparing the obtained manipulated value with the quantity of displacement of the steering means relative to the body, and outputting as a controlled value a value corresponding to the difference between the manipulated value and the quantity of displacement of the steering means relative to the body, the steering means being controlled according to the controlled value.

According to the second method above-mentioned, the manipulated value can be obtained based on the quantity of deviation of the travelling body from the predetermined route by measuring the quantity and direction of deviation of the travelling body from the predetermined route and the quantity and direction of displacement of the steering means relative to the body (the quantity and direction of steering), inputting the quantity of deviation of the travelling body from the predetermined route into the antecedent operation part in the same manner as in the first method, performing a grade operation, and inputting the obtained grade into the consequent operation part. Then, the travelling body can be controlled by a controlled value based on the quantity of deviation of the travelling body from the predetermined route and the quantity of steering at present, by comparing the manipulated value outputted from the consequent operation part with the quantity of displacement of the steering means relative to the body, inputting as the controlled value a difference between the former and the latter, and driving the steering means according to the controlled value.

The second object of the present invention is accomplished by a control system for controlling a travelling body along the predetermined route comprising a travelling body having a body and a steering means, an optical pointer indicating the displacement of the steering means relative to the body, means for providing visible light arranged along the predetermined route, an indicator arranged within the body on which the optical pointer and the visible light are projected, a color image pickup means arranged facing the indicator, a color image receiving means for displaying an image monitored by the color pickup means, an image processing means connected to the color receiving means and in which an operation on coordinates of the optical pointer and visible light projected on the indicator is performed, a fuzzy operation means in which the manipulated value is calculated based on the membership functions at the antecedent and the consequent operation parts which are predetermined and which correspond to values of coordinates of visible light calculated by the image processing means, a comparator means for comparing the manipulated value calculated by the fuzzy operation means with the coordinate values of optical pointer caluclated by the image processing means and outputting as a controlled value the difference between the former and the latter, and a driving means for driving the steering means according to the controlled value outputted from the comparator into the driving means.

In the above-mentioned system, it is preferable that the optical pointer and the visible light have colors varying with each other. Further, it is preferable that the fuzzy operation means is comprised of an antecedent operation part for prestoring the membership functions corresponding to the distances between the origin of coordinates and the visible light, performing a grade operation based on input data of the distance between the origin of coordinates and the visible light, and outputting the grade, and a consequent operation part for prestoring the membership functions corresponding to the manipulated value, performing an operation on manipulated values based on the grade outputted from the antecedent operation part, and outputting the manipulated value, wherein in the consequent operation part the membership functions corresponding to the manipulated values are given into triangles, respectively, the triangles are reduced according to the grade inputted, respectively, moments of rotation are obtained from the products of areas of the reduced triangles and the positions of the center of gravity thereof, respectively, the obtained moments of rotation are summed up, and the sum total of the moments of rotation is divided by the sum total of areas of the reduced triangles by which the controlled value is obtained, which controlled value is outputted from the fuzzy operation means.

In the above-mentioned system, data corresponding to quantities of deviation of the body from the predetermined route are prestored as antecedent membership functions in the antecedent operation part, data of manipulated values corresponding to quantities of deviation of the body from the predetermined route as the know-how of the operator are prestored as consequent membership functions in the consequent operation part, a quantity and direction of the body from the predetermined route are measured, and the above-mentioned data corresponding to the quantity of deviation of body from the predetermined route is inputted into the fuzzy operation means, by which at the antecedent operation part, the grade of the membership function based on data inputted at the antecedent operation part can be calculated and the grade can be outputted into the consequent operation part. Then, the operations concerning reducing the membership functions and the center of gravity of the combined reduced membership functions based on the grade at the consequent operation part can be performed, and the result can be outputted as the manipulated value.

Further, the travelling body can be always moved forward along the predetermined route by determining a quantity and direction of steering at the measuring point by measuring the quantity and direction of displacement of the steering means relative to the body, comparing the steered value with the manipulated value, and driving the steering means by using the difference of the former and the latter as the controlled value.

In the above-mentioned control system, the distance and direction of deviation of the body from the predetermined route and the quantity and direction of the steering means relative to the body can be measured by disposing the indicator in the body, arranging visible light along the predetermined route and providing an optical pointer displaying the displacement of the steering means in the body, and projecting the visible light and the optical pointer.

That is to say, a laser spot can be formed on the indicator disposed on a plane intersecting the predetermined route by projecting a laser beam as visible light on the indicator. In this case, when a spot origin is set at a position of the laser spot on the indicator at the starting point of the travelling body and the laser spot is moved away from the spot origin, the quantity of moving away of the laser beam from the spot origin on the indicator corresponds to the quantity of deviation of the travelling body from the predetermined route, and the direction of moving away of the laser beam from the spot origin on the indicator corresponds to the direction of deviation of the travelling body from the predetermined route.

Further, the quantity of displacement and direction of the steering means relative to the body can be measured by projecting the displacement of the steering means relative to the body on the indicator by means of the optical pointer.

That is to say, if a pointer origin is set at a position of the optical pointer relative to the indicator when the steering means is put at a neutral position relative to the body, the optical pointer travels on the indicator with the displacement of the steering means relative to the body. Therefore, the present quantity and direction of steering can be measured by measuring the quantity and direction of deviation of the optical pointer relative to the pointer origin.

Therefore, the quantity and direction of moving away of the laser spot from the spot origin can be expressed by coordinates, and the quantity and direction of deviation of the optical pointer from the pointer origin can be expressed by monitoring the indicator with the color image pickup means while the travelling body is moved forward, and processing the image of the indicator with the image processing means connected through the color image receiving means with the color image pickup means. The coordinates of the laser spot and the optical pointer in be expressed in X-Y rectangular coordinates, wherein the quantity and direction of moving away of the laser spot relative to the spot origin and the quantity and direction of deviation of the optical pointer from the pointer origin can be expressed by X coordinates directed horizontally on the indicator and Y coordinates directed vertically on the indicator, concerning a travelling body such as a shield.

Further, the grade of the membership function stored in the antecedent operation part can be calculated by inputting the quantity of moving away of the laser spot from the spot origin into the antecedent operation part in the fuzzy operation means, performing the operation of reducing of the membership function stored in the consequent operation part based on the grade inputted and the position of the center of gravity of the combined reduced membership functions at the consequent operation part, and outputting the result as the manipulated value.

The manipulated value is a value based on the quantity of moving away of the laser spot from the spot origin, and does not include the present quantity of the steering operation. Therefore, by comparing the quantity of deviation of the optical pointer from the pointer origin with the manipulated value outputted from the fuzzy operation means at the comparator, the difference between the former and the latter can be outputted. Then the travelling body can be controlled along the predetermined route by driving the driving means complying with the controlled value.

Further, the optical pointer having a color different from the color of the visible light facilitates the operation of image processing at the image processing means.

Further, the fuzzy operation means is comprised of the antecedent operation part in which the membership functions corresponding to distances between the origin and the visible light are prestored, and a given grade operation is performed based on input data of a distance between the origin and the visible light and the grade corresponding to the distance between the origin, and from which the visible light is outputted from the antecedent operation part, and a consequent operation part in which the membership functions corresponding to the manipulated value are prestored, and a given operation of a manipulated value is performed based on the grade outputted from the antecedent operation part, wherein the membership functions corresponding to the manipulated value are given in the form of triangles, respectively, the triangles are reduced according to the inputted grade, moments of rotation are obtained from products of areas of the reduced triangles by positions of the centers of gravity thereof and these moments of rotation are summed up, and manipulated value is obtained by dividing the sum total of the moments of rotation by the sum total of areas of the reduced triangles, and the obtained manipulated value is outputted from the consequent operation part. With the above mentioned simple fuzzy operation means, an operation of manipulated value (defuzzication) can be performed in a short time.

The lengths of the bases of several triangles and the position of the centers of gravity thereof projected on the base thereof can be determined uniformly by defining the membership functions of fuzzy set in the form of triangles and aligning these triangles on the axis of abscissa according to the control rule. Therefore, the lengths of the base of the reduced triangles and the positions of the centers of gravity thereof projected on the axis of the abscissa are not changed even if the consequent membership functions expressed in the form of the triangles are reduced by degrees and outputted from the antecedent. Further, the areas of the reduced triangles can be easily calculated by lengths of the bases of original triangles and the grade.

Therefore, an operation relating to the position of the center of gravity of the combined reduced triangles can be performed by obtaining moments of rotation from product of the areas of several triangles, summing up these moments of rotation and dividing the sum total of the moments of rotation by the sum total of the areas of reduced triangles. The value of the above-mentioned position of the center of gravity can be outputted as the manipulated value from the consequent operation part.

By means of the above mentioned system of controlling a travelling body so as to move forward along a predetermined route by using the stored know-how for steering the travelling body of by a plurality of operators of experience, an operator can automatically control the travelling body so as to move forward along the predetermined route so that the operator can be easily control the travelling body without the help of a veteran operator when the travelling body is moved forward along the predetermined route.

DETAILED DESCRIPTION OF THE PREFERRED EMBODIMENT

A method and system for the control of a shield wherein the aforementioned method and system for controlling a travelling body so as to move forward along the predetermined route of the movement of travelling body are applied for the control of a shield as a travelling body are illustrated by way of example.

A method and system for controlling a travelling body according to the present invention concern a method and system for moving forward a travelling body, for example a shield A along the predetermined route in the ground for laying a water supply pipe or a sewer pipe in the ground by measuring the quantity and direction of deviation of the shield A from the predetermined route. The deviation is caused by a change in the ground resistance and other causes. The needed correction is then made in the direction of the shield A according to the measured quantity and direction of deviation of the shield A from the predetermined route.

Figure 5A:
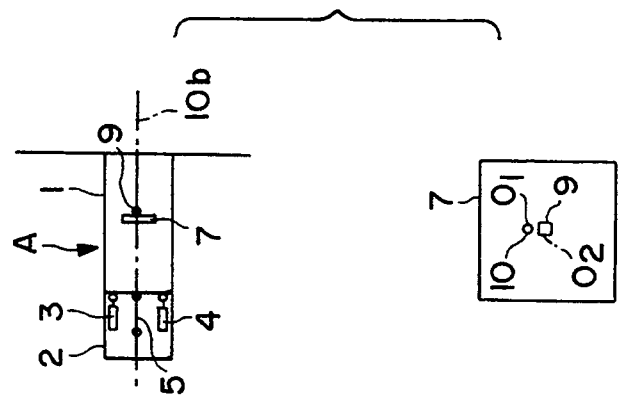
FIGS. 5(a) to (c) are views of a shield which is moved off a predetermined route with a forward movement of the shield, respectively.
Figure 5B:
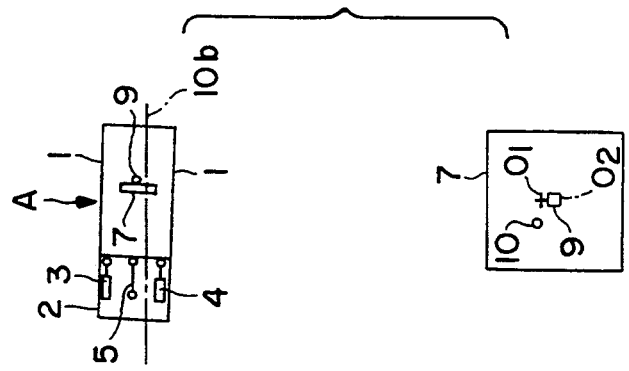
Figure 5C:
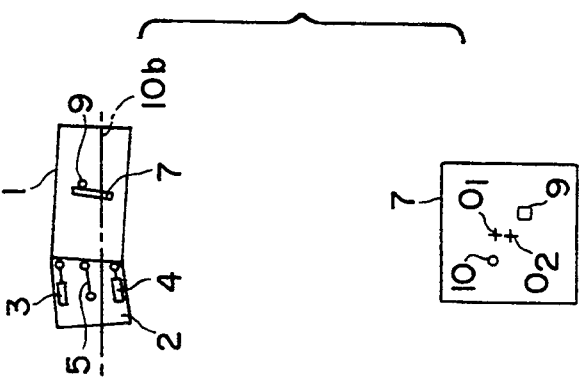

Referring now to FIG. 5(a), first, a shield A is positioned in a pit formed at the starting point of laying out a pipeline B. Then the shield A is pushed from the right of FIG. 5 (hereinafter referred to as "the rear") toward the left of FIG. 5 (hereinafter referred to as "the front") along the predetermined route, wherein if there is a change in the ground resistance in the front, the shield A deviates from laser beam 10b travelling along the predetermined route as shown in FIG. 5(b), in spite of the shield A being pushed forward with a fixed power. At this time, according to the present invention, an indicator 7 mounted in a body 1 of shield A is monitored by a television camera 8, the quantity and direction of deviation of the shield A from the spot origin $o_1$ of laser spot 10 are measured by processing the image of the indicator 7, and the shield A is controlled so as to be moved forward along the laser beam 10b by adjusting a head 2 of shield A relative to the body 1 by controlling jacks 3 and 4 according to the quantity and the direction of deviation of the shield A from the predetermined route as shown in FIG. 5(c).

Figure 1:
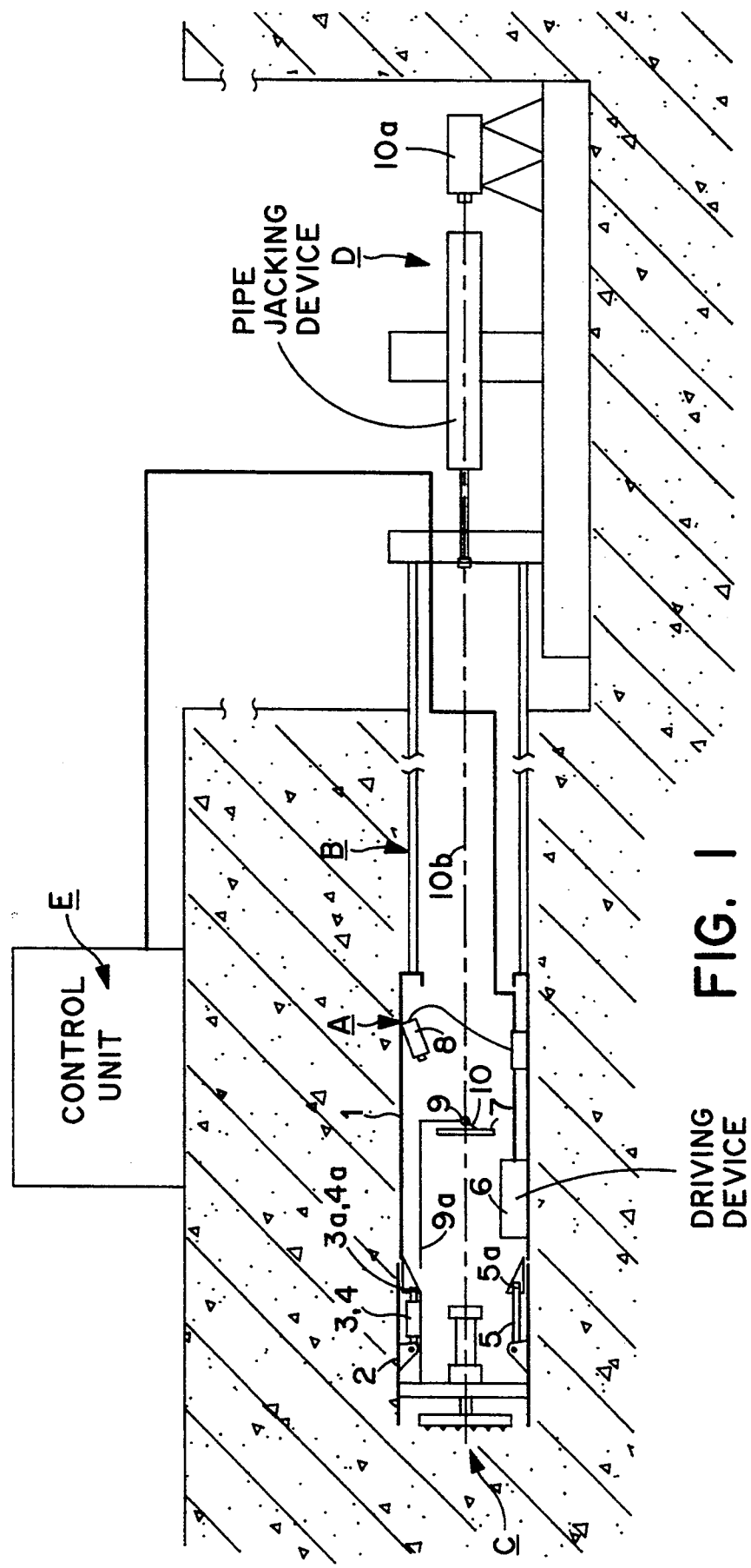
FIG. 1 is a schematic illustration of a shield.

Referring to FIG. 1, an outline of the structure of the shield A and its accessories is given.

A shield A shown in FIG. 1 is used when laying pipes such as water pipes or sewer pipes, etc. in the ground. The shield A has the same structure as that of a shield disclosed in Japanese Patent Laid-open 57-205698. The shield A excavates earth and sand by rotating a cutter head C provided in the front of the shield A. Excavated earth and sand are discharged out by a pump mounted in the shield A, while the shield A is pushed forward by pipe jacking device D mounted in the rear of the shield A, and pipes are laid by being joined with each other in the ground by which the desired pipeline B is constructed in the ground.

The shield A comprises a body 1 provided with meters, pumps, etc. not shown in the figure, and a head 2 including a steering means for controlling the travelling direction of the body 1 along the predetermined route, the head being provided in the front of the body 1. The body 1 is connected with the head 2 through two jacks 3 and 4 and a rod 5 positioned at equal spaces on the circumference of a circle having the center identical with the axial center of shield A. The jacks 3 and 4, and the rod 5 are provided with universal joints 3a, 4a, and 5a, at ends of the joints 3 and 4 and the rod 5, respectively, and attached to both the body 1 and the head 2 through the universal joints 3a, 4a, and 5a. Thus, the head 2 can turn around the joint 5a of rod 5 in a direction different from the direction of the body 1 by the desired angle.

In the present embodiment, hydraulic cylinders are used as the jacks 3 and 4. The jacks 3 and 4 are connected to a driving device 6 comprised of an hydraulic unit provided in the body 1, and a flow control unit for controlling the flow rate of pressure oil and other fluid.

An indicator 7 is provided at a fixed position of the body 1, and a television camera 8 as means for monitoring the indicator 7 is arranged facing the indicator 7. Laser beam 10b which defines both an image of a below-mentioned optical pointer 9 and the predetermined route is projected on the indicator 7. The indicator 7 is monitored by the television camera 8 and the monitored image is processed by image processing unit 22, by which the quantity and direction of deviation of the body 1 from the laser beam 10b, and the quantity and direction of displacement of the head 2 relative to the body 1 can be detected.

A bar 9a reaching the indicator 7 is secured at a fixed position of the head 2. An optical pointer 9 is provided at an end of the bar 9a which is identical with the axial center of shield A so as to be positioned at the rear of the indicator 7. The optical pointer 9 is displaced on the surface of indicator 7 together with the displacement of the head 2 relative to the body 1. As the optical pointer 9, use can be made of an optical pointer having a cross pattern, for example and also of a light emitting element such as an LED and other types of elements.

In the present embodiment, an LED emitting green (G) light is used as optical pointer 9.

A laser oscillator 10a such as a laser transit is arranged in the rear of shield A, from which the laser beam 10b travelling along the predetermined route is emitted toward the indicator 7. The laser beam 10a travels in alignment or parallel with the axis of pipe B. The laser beam 10b which is projected on the indicator 7 forms a laser spot 10 on the indicator 7.

In the present embodiment, use is made of a He-Ne laser emitting a red color (R) laser beam.

Figure 4:
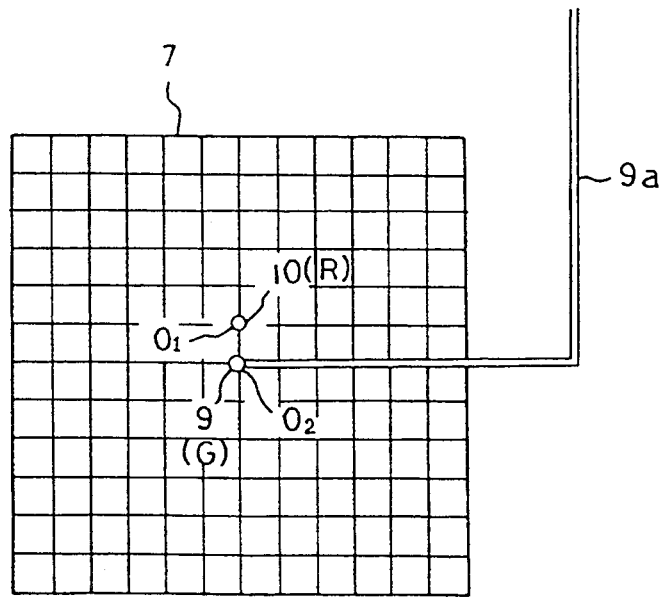
FIG. 4 is a representation of an indicator taken from the back.

Therefore, as shown in FIG. 4, a red color laser spot 10 is formed on the indicator 7 by projecting the laser beam 10b on the indicator 7. This laser beam 10a is not necessarily required to be in alignment with the indicator 7. The position of laser spot 10 at the time when the shield A is started is stored as a spot origin $o_1$, and thereafter the quantity and direction of the body 1 from deviating the laser beam 10b can be measured by measuring the distance between a laser spot 10 and the spot origin $o_1$ and the direction of deviation of the laser spot from the spot origin in the forward movement of the shield A. When the head 2 is in a neutral position relative to the body 1, LED 9 arranged on a side of the indicator 7 facing the television camera 8 is positioned to be in alignment with the axis of shield A, wherein a position of the LED 9 in starting the shield A is pointer origin $O_2$.

In the figure, E designates a control panel provided with a control unit for controlling the shield A, the pipe jacking device D and others, an image receiving unit for monitor and other elements.

Figure 2:
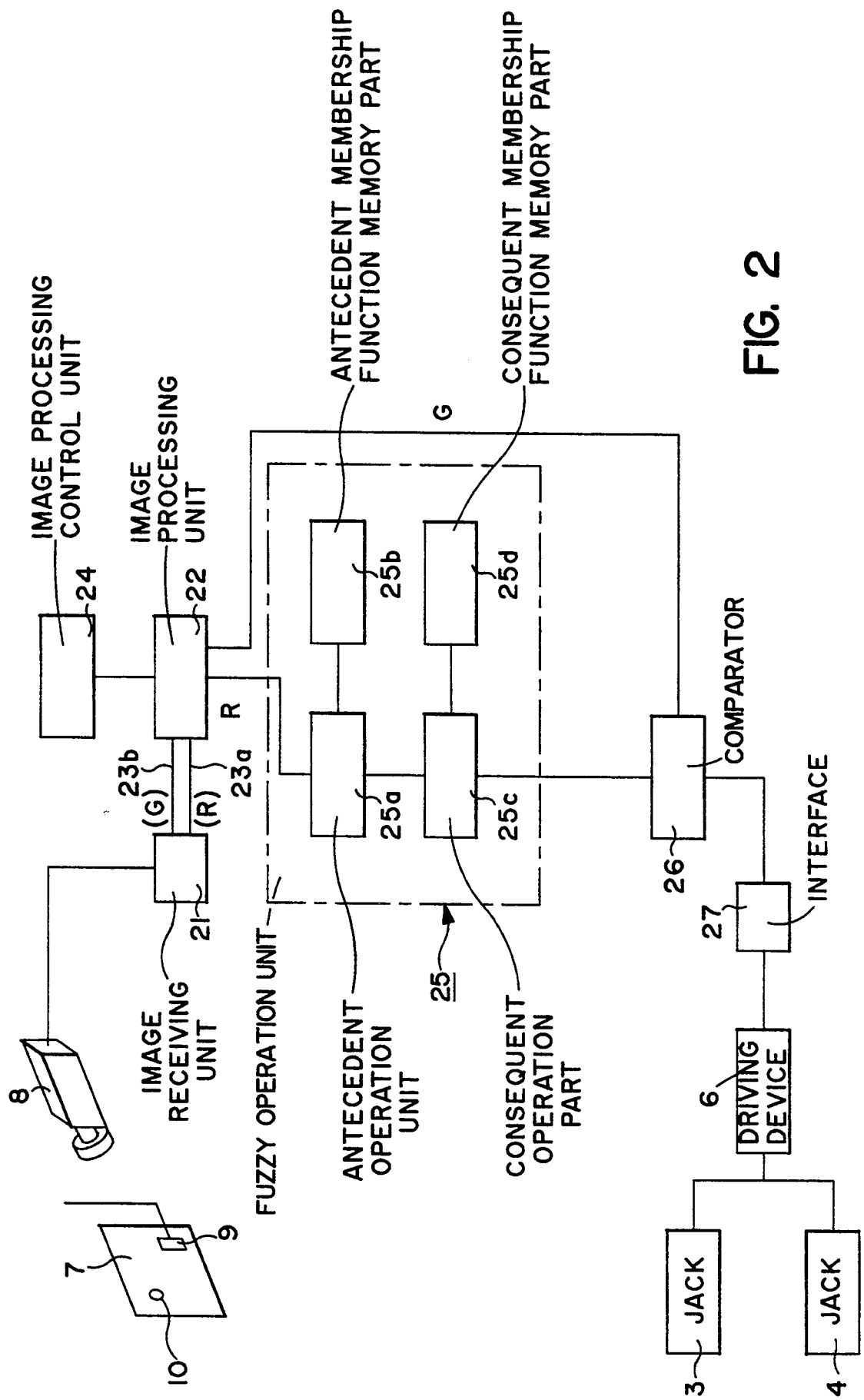
FIG. 2 is a block diagram of a control system for controlling the shield.
Figure 3:
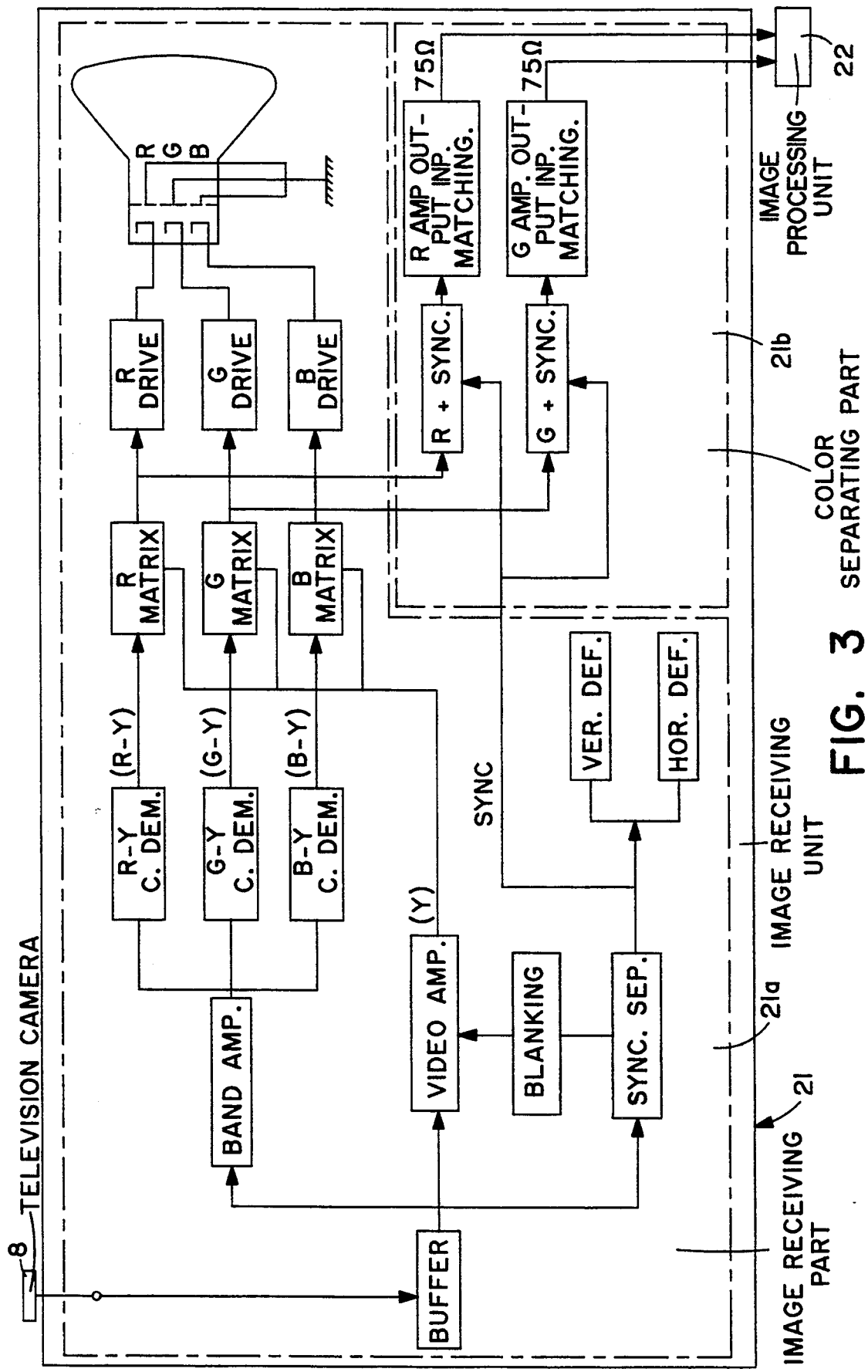
FIG. 3 is a block diagram of a circuit by which a visible or optical pointer data is retrieved from an image receiving device.

Then, referring to FIGS. 2 and 3, the structure of a control system for controlling the above-mentioned shield A is explained.

As shown in FIGS. 2 and 3, the television camera 8 is connected with an image receiving unit 21. As shown in FIG. 3, the image receiving unit 21 is comprised of a image receiving part 21a and a color-separating part 21b. The receiving part 21a has the same structure as that of a conventional television image receiving unit, which functions as a screen for a monitor display, which shows a picture of the indicator 7 taken by the television camera 8. The color-separating part 21b performs the functions required for separating a signal of the color G of LED 9 and a signal of the color R of laser spot 10 from a picture of the indicator 7 taken by the television camera 8 and sending these signals to the image processing unit 22.

That is to say, in the image receiving unit 21, a signal of the color R corresponding to laser spot 10 can be separated from the picture of indicator 7 taken by the television camera 8 and this signal can be sent to the image processing unit 22 by inputting both an output signal from R the matrix part of the image receiving part 21a and a signal of a synchronizing separation part into an R+syncronizing part by which the R signal is synchronized with a picture signal while amplifying the R signal in an output impedance adjusting part. Further, the G signal of LED 9 is also separated from the picture of indicator 7, and sent to the image processing unit 22 through a wire 23b.

The image processing unit 22, which comprises a conventional image processing unit, is used for calculating the coordinate value of the G signal and the R signal transmitted from the image receiving unit 21, The image processing unit 22 is connected to an image processing control unit 24 having a memory part, a control part and other parts. The image processing unit stores data of the spot origin $o_1$ and the pointer origin $o_2$ shown in FIGS. 4 and 5 drawn from a picture of the indicator 7 of shield A in starting the shield A, and coordinate data of the transmitted R signal relative to the spot origin $o_1$ are outputted into a fuzzy operation unit, and coordinate data of the transmitted G signal relative to the pointer origin $o_2$ is outputted into comparator 26.

Therefore, to calculate the coordinate value of the R signal relative to the spot origin $o_1$, the image processing unit 22 makes possible measurements of a distance between the body 1 and the laser beam 10b and the direction of deviation of the body 1 from the laser beam 10b, and to calculate the coordinate value of the G signal relative to the pointer origin $O_2$ the image processing unit 22 makes possible measurements of the quantity and direction of displacement of LED 9 relative to the body 1, that is, the quantity and direction of displacement of the head 2 relative to the body 1.

In the present embodiment, the image hold signal is transmitted at fixed intervals from the image processing control unit 24 to the image processing control unit 22, by which the image information at that time is held at the image processing unit 22. In the above-mentioned image, coordinate values of the laser spot 10 are calculated on an X-Y rectangular-coordinate system in which the origin is spot origin $o_1$, X is the abcissa, and Y is the ordinate, and with data on the X-coordinate of the laser spot 10 being outputted into the fuzzy operation unit 25, and data on the X-coordinate of the LED 9 being outputted into the comparator 26. Further, in the fixed time after data on the X-coordinates of both laser the spot 10 and the LED 9 are outputted, data on the Y-coordinate of laser spot 10 is outputted into the fuzzy operation unit 25, while data on the Y-coordinate of the LED 9 is outputted into the comparator 26.

Data on the X and Y-coordinates of both the laser spot 10 and the LED 9 are thus outputted in order into the fuzzy operation unit 25 and the comparator 26, by which a manipulated value according to the horizontal deviation (X) and vertical deviation (Y) can be determined in order.

The fuzzy operation unit 25 is comprised of an antecedent operation unit 25a, an antecedent membership function memory part 25b, a consequent operation part 25c, a consequent membership function memory part 25d and other elements, wherein grade is calcuted from the corresponding membership function using as observed values data on the coordinate of the R signal transmitted from the image processing unit 22, and outputted into the consequent operation part, and in the consequent operation part, the reduction of the membership function complying with the antecedent membership function, and the position of the center of gravity of the reduced membership function are calculated and a value corresponding to the position of center of gravity is outputted as the manipulated value from the fuzzy operation unit 25.

There will be later explained the operational method by the above-mentioned fuzzy operation unit 25.

The signal of the manipulated value outputted from the fuzzy operation unit 25 is transmitted to the comparator 26, in which the optimum controlled values are calculated by comparing the manipulated value corresponding to the quantity of deviation of the body 1 from laser beam 10b with the quantity of correction in the direction (manipulated value) given at present to the body 1 and from which the optimum controlled values are outputted.

An interface 27 changes the signal outputted from the comparator 26 as controlled values into a signal for controlling the quantities of the opening and closing of a valve of a control unit for controlling the flow rate of hydraulic oil to the driving device 6, by which the amount of oil pressure supplied to the jacks 3 and 4 is controlled so that the head 2 is displaced relative to the body 1 according to the controlled values inputted from the comparator 26.

A a concrete explanation is now given about the inferential operation of the quantities of control performed by the fuzzy operation unit 25 when the shield A is operated in the horizontal direction.

Figure 6:
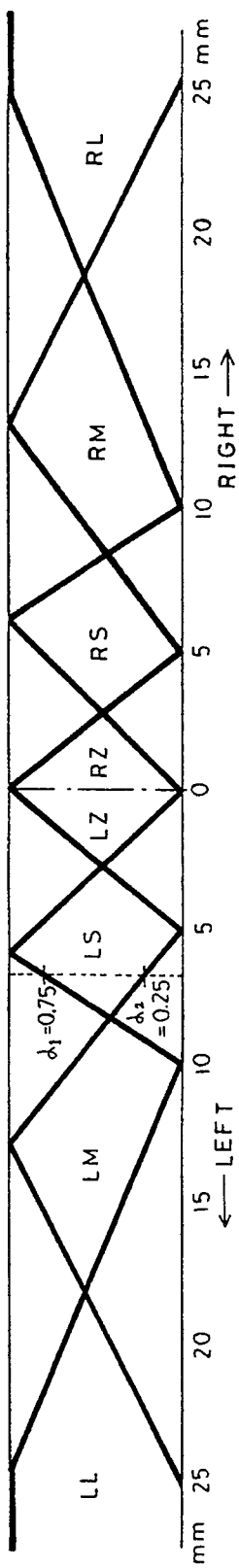
FIG. 6 is a graphical representation showing the antecedent membership functions when the shield is controlled.

The membership functions shown in FIG. 6 are stored by the antecedent membership function memory part 25b. The membership functions relate to the quantity of horizontal deviation of the body 1 from laser beam 10b. Therefore, the membership functions corresponding to the quantity of vertical deviation of the body 1 from laser beam 10b are also stored in the antecedent membership function memory part 25b.

Hereinafter, the inferential method of determining the control quantities corresponding to the horizontal deviations is explained. However, the determining of the controlled values corresponding to the quantity of vertical deviation of the body 1 from laser beam 10b can be carried out in the same way.

The membership function shown in FIG. 6 shows degrees of whether, when an operator observes the actual deviation of the laser spot 10 from the spot origin $0_1$ on the screen of the image receiving unit 21, he has a feeling that this deviation is large, or he has a feeling that this deviation is medium, or he has a feeling that this deviation is small.

The membership function shown in the figure and the membership function in the consequent part is set based on the accumulation of knowhow of many operators.

For example, when laser spot 10 deviates from the spot origin $0_1$ to the left by 7 mm, it is shown that there exist an operator who has a feeling that the deviation of laser spot 10 from the spot origin $0_1$ is small and an operator who has a feeling that the deviation is medium. The angle associated with feeling that an operator has that the deviation is small or medium is called the grade.

The quantity of deviation of the laser spot 10 from the spot origin $0_1$ is measured at the image processing unit 22. Data corresponding to the quantity of deviation of the laser spot from the spot origin is transmitted to the antecedent operation part 25a, in which the grade is calculated based on the memorized antecedent membership functions. In the operation, for example, when the quantity of deviation of the laser spot from the spot origin is 7 mm and the direction of deviation is to the left, the value of the membership function at the point of 7 mm on the left in FIG. 6 is calculated by which the grade is obtained, that is, from the figure, grade can be obtained as follows:

the grade corresponding to a small deviation to the left $$\alpha_1 = 0.75;$$

the grade corresponding to a medium deviation to the left $$\alpha_2 = 0.25.$$

These grades $\alpha_1$ and $\alpha_2$ are outputted into the consequent operation part 25c.

Figure 7:
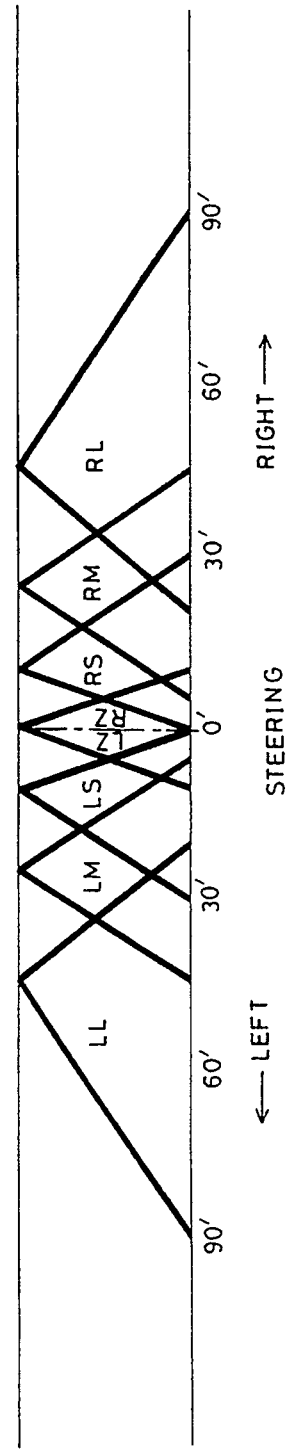
FIG. 7 is a graphical representation showing the consequent membership functions corresponding to the antecedent membership functions.

The membership function shown in FIG. 7 is memorized at the consequent membership function memory part 25d. The membership function shows, when an operator observes actual deviation of laser spot 10 from the spot origin $0_1$ on the screen of the image receiving unit 21, the quantity of displacement with which the head 2 is displaced according to the actual deviation, that is a manipulated value, wherein respective triangles correspond to the antecedent membership functions shown in FIG. 6.

The direction of operation in FIG. 7 is the reverse to observed direction of deviation.

As shown in the figure, when the consequent membership functions are expressed in triangles arranged parallel to each other on the X-coordinate, the positions and shapes of these triangles are set uniquely.

FIGS. 8(a) to (d) shows the positions of the centers of gravity $G_1 \sim G_4$ of four triangles $B_1 \sim B_4$ which comprise the righthand part of the consequent membership functions, and lengths $W_1 \sim W_4$ of the bases of the triangles $B_1 \sim B_4$.

As shown in the figure, the heights of several triangles $B_1 \sim B_4$ are equal to each other and the lengths $W_1 \sim W_4$ of the bases of several triangles $B_1 \sim B_4$ are set uniquely. Therefore, the positions of the centers of gravity $G_1 \sim G_4$ of several triangles $B_1 \sim B_4$ can be easily obtained by a conventional algebraic calculation.

Figure 9:
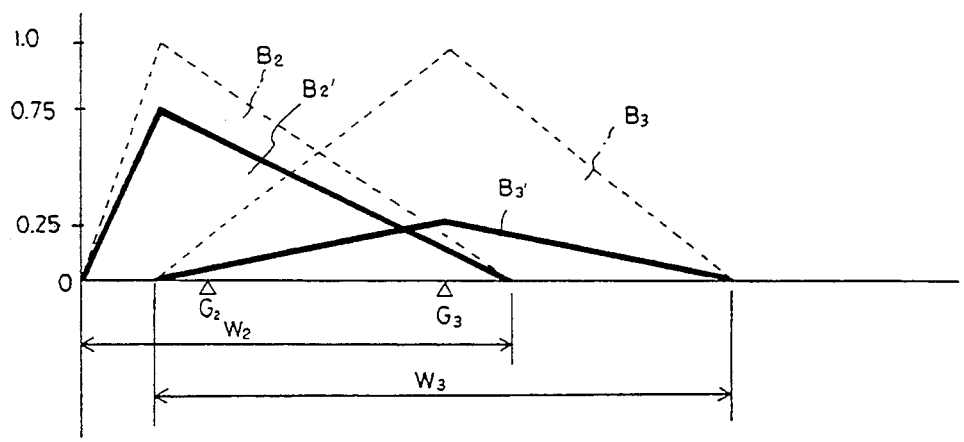
FIG. 9 is a graphical representation showing the reduced consequent membership function wherein the triangles of consequent membership functions are reduced by the grade, together with the consequent membership functions which are not reduced by the grade shown by the dotted line.

FIG. 9 shows reduced triangles $B_2'$ and $B_3'$ in which $B_2$ and $B_3$ of the membership functions corresponding to grade $\alpha_1$ and $\alpha_2$ which are outputted from the antecedent operation part when the quantity of deviation of the laser spot 10 from the spot origin $0_1$ is reduced by the grade $\alpha_1$ and $\alpha_2$.

As shown in the figure, the original triangle $B_2$ and the reduced triangle $B_2'$ share the common base $W_2$, and the original triangle $B_3$ and the reduced triangle $B_3'$ share the common base $W_3$, and the center of gravity $G_2$ of the triangles $B_2$ and $B_2'$ and the center of gravity $G_3$ of the triangles $B_3$ and $B_3'$ does not change.

Therefore, when the positions of the centers of gravity of triangles $B_2$ and $B_3$ are $G_2$ and $G_3$, respectively, the center of gravity $Y_0$ can be obtained from the resultant moment obtained by calculating the moment of rotation having a weight corresponding to the areas of the reduced triangles $B_2'$ and $B_3'$ about the reduced triangles $B_2'$ and $B_3'$ as follows:

$$Y_0 = \{(G_2 \cdot \alpha_1 \cdot W_2 + G_3 \cdot \alpha_2 \cdot W_3)/2\} / \{(\alpha_1 \cdot W_2 + \alpha_2 \cdot W_3)/2\}.$$

Then, if $M_2$ is equal to $G_2 \cdot W_2$ and $M_3$ is equal to $G_3 \cdot W_3$, $$Y_0 = \{(M_2 \cdot \alpha_1 + M_3 \cdot \alpha_2)/2\} / \{(\alpha_1 \cdot W_2 + \alpha_2 \cdot W_3)/2\}.$$

The $Y_0$ value thus obtained indicates the position of the center of gravity of the combined triangle which is composed of the triangle $B_2'$ and $B_3'$. Accordingly, the $Y_0$ value can be outputted as the manipulated value from the consequent operation part 25c.

As above-mentioned, the following general formula for calculating the manipulated value can be obtained:

$$Y_o = \left( \sum_{i=1}^{n} Mi \cdot ai \right) / \left( \sum_{i=1}^{n} Wi \cdot ai \right),$$

The method for controlling the shield A is explained referring to FIGS. 5(a) to (c).

FIG. 5(a) shows the shield A at the starting position, at which the head 2 stands in the neutral position with respect to the body 1, and the position of LED 9 relative to the indicator 7 coincides with the axial center of the shield A. The indicator 7 is always monitored by the television camera 8, and the image of indicator 7 is processed at fixed intervals for measurement by the image processing unit 22. Then, the position of LED 9 when starting the forward movement of the shield is stored as the pointer origin $o_2$ and the position of laser spot 10 at this time is stored as the spot origin $o_1$ in the image processing unit 24, respectively.

When the shield A deviates from the laser beam 10b projected along the predetermined route with the advance of the shield A as shown in FIG. 5(b), the laser spot 10 on the indicator 7 deviates from the spot origin $o_1$. Then, the position of the laser spot 10 is converted into X coordinate data and Y coordinate data on the X-Y coordinate system by the image processing unit 22, and the X coordinate data and the Y coordinate data are outputted into the fuzzy operation unit 25. At the image processing unit 22, the quantity of deviation of the LED 9 from the pointer origin $o_2$, and the direction of deviation of the LED 9 from the pointer origin $o_2$ are measured, and the quantity of deviation of the LED 9 from the pointer origin $o_2$ is converted into the X coordinate data and the Y coordinate data, which are outputted into the comparator 26. However, since in FIG. 5(b), the head 2 stands in the neutral position relative to the body 1, the X coordinate data and the Y coordinate data are outputted as 0 into the fuzzy operation unit.

When the measured quantity of deviation of the laser spot 10 from the spot origin $o_1$ is 7 mm and a direction of deviation thereof is to the left of the spot origin, the grade corresponding to the membership function of lefthand small deviation, $\alpha_1$ being equal to 0.75 and the grade corresponding to the membership function of lefthand medium deviation, $\alpha_2$ being equal to 0.25 are outputted from the antecedent operation unit.

Then, the triangles $B_2$ and $B_3$ corresponding to the consequent membership function of righthand small deviation and the consequent membership function of righthand medium deviation, respectively, are reduced with the grade $\alpha_1$ being equal to 0.75 and the grade $\alpha_2$ being equal to 0.25, by which the reduced triangles $B_2'$ and $B_3'$ can be obtained as shown in FIG. 9.

Figure 8A:
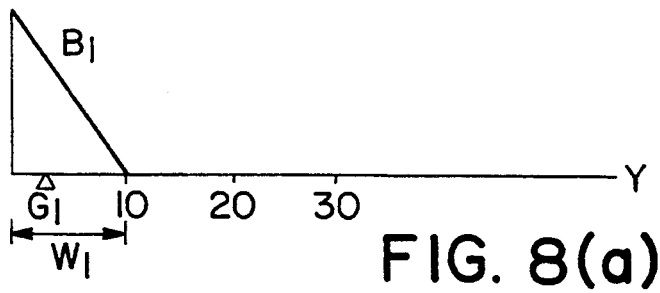
FIGS. 8(a) to (d) are graphical representations showing the positions of the centers of gravity of triangles of the consequent membership functions.
Figure 8B:
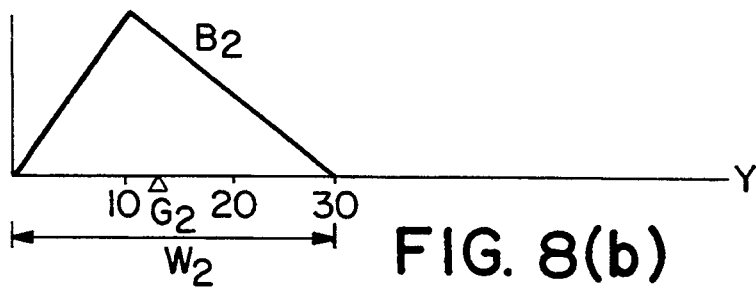
Figure 8C:
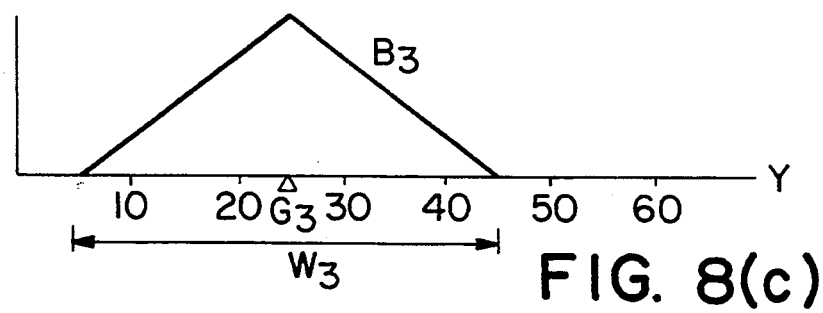
Figure 8D:
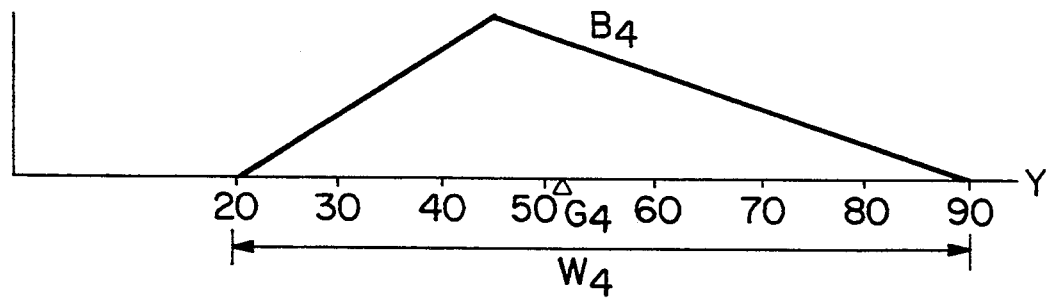

From FIG. 8(b), the length $W_2$ of the base of triangle $B_2$ is equal to 30, the position $G_2$ of the center of gravity thereof is equal to 13.3, $M_2 (= G_2 \times W_2)$ is equal to 400, and from FIG. 8(c), the length $W_3$ of the base of triangle $B_3$ is equal to 40, position $G_3$ of the center of gravity thereof is equal to 25.0, and $M_3 (= G_3 \times W_3)$ is equal to 1,000.

Therefore, from the above $M_2$, $\alpha_1$, $M_3$, and $\alpha_2$, $$M_2 \cdot \alpha_1 + M_3 \cdot \alpha_2 = 400 \times 0.75 + 1,000 \times 0.25 = 550.$$

From the above $W_2$, $\alpha_1$, $W_3$ and $\alpha_2$, $$W_2 \cdot \alpha_1 + W_3 \cdot \alpha_2 = 30 \times 0.75 + 40 \times 0.25 = 32.5.$$

From the obtained values, the horizontal manipulated value can be obtained as follows:

the horizontal manipulated
value = 500 ÷ 32.5 = 16.9238(min.)

The manipulated value is transmitted from the fuxzzy operation unit 25 into the comparator 26, at which the manipulated value is compared with horizontal coordinate data on the deviation of LED 9. Since the quantity of deviation of the LED from the pointer origin is equal to 0, the above manipulated value is sent as the controlled value through the interface 27 to the driving device 6, by which the hydraulic oil flow control unit in the driving device 6 is operated according to the manipulated value to such an extent that jacks 3 and 4 are operated by the given amount by which the head 2 is displaced to the left with respect to the body 1.

When the shield A further moves forward and reaches the position shown in FIG. 8(c), in the same manner as the above mentioned manner, the quantity and direction of deviation of laser spot 10 from the spot origin $o_1$ are measured, while the quantity and direction of deviation of the LED 9 from the pointer origin $0_2$ are measured, and then the X coordinate data and the Y coordinate data of the laser spot 10 are outputted into the fuzzy operation unit 25, at which the manipulated value is calculated, and the manipulated value is outputted into the comparator 26, while the X coordinate data and the Y coordinate data about the LED 9 is outputted to the comparator 26. Then, at the comparator 26, these data are compared with each other, and the difference between these data is sent as the controlled value through the interface 27 to the driving device 6.

The shield A can be driven along the laser beam as the predetermined route by carrying out at the fixed intervals the above mentioned operations.

In addition, when driving the shield A, it may be also possible to measure only the quantity and direction of deviation of the laser beam 10 from the spot origin $o_1$, input the coordinate data into the fuzzy operation unit 25, at which the manipulated value is operated. In this case, the control of the shield is carried out according to an open controlling method.

What is claimed is:

1. A control system for controlling a travelling body having a main body and steering means connected to the main body, along a predetermined route, said system comprising:
   an optical pointer indicating the displacement of the steering means relative to the main body;
   a light source emitting a visible light beam extending along the predetermined route;
   an indicator positioned within the main body and on which said optical pointer and the visible light beam are projected;

color image pickup means facing said indicator;

color image receiving means for displaying an image monitored by said color image pickup means;

image processing means, connected to said color image receiving means, for determining the coordinates of said optical pointer and the visible light beam projected on said indicator;

fuzzy operation means for calculating a manipulated value based on predetermined membership functions of antecedent and consequent operation units corresponding to the coordinates of the visible light beam calculated by said image processing means;

comparator means for comparing the manipulated value calculated by said fuzzy operation means with the coordinates of said optical pointer calculated by said image processing means and outputting as a controlled value a difference between the manipulated value and the coordinates of said optical pointer; and driving means for driving the steering means according to the controlled value outputted from said comparator means into said driving means.

2. A control system as claimed in claim 1, wherein said optical pointer and the visible light beam are of different colors.

3. A control system as claimed in claim 1, wherein said fuzzy operation means comprises:

an antecedent operation unit in which membership functions corresponding to the distance between an origin of the coordinates and the visible light beam are prestored and from which a grade calculated based on inputted data of the distance between the origin of the coordinates and the visible light beam is outputted; and a consequent operation unit in which membership functions corresponding to a plurality of manipulated values are prestored and from which a manipulated value is outputted based on the grade outputted from said antecedent operation unit, wherein said consequent operation unit generates reduced consequent membership functions represented by reduced triangles on a graph of an actual deviation of the visible light beam and the quantity of deviation of the steering means by reducing triangles representing consequent membership functions on the graph according to the outputted grade, calculating the moments of rotation of each of the reduced triangles, summing the moments of rotation of the reduced triangles and dividing the sum total of areas of the reduced triangles to produce the manipulated value, and outputting the manipulated value from said fuzzy operation means.

4. A method for controlling a travelling body along predetermined route, said traveling body having a main body and steering means connected to said main body via jacks and rods, said method comprising the steps of:

providing a plate-shaped indicator disposed perpendicular to an axis of the main body;

emitting light of a first color with an optical pointer linked with the steering means to show the steering direction of the steering means;

illuminating the indicator with a laser beam spot of a second color;

monitoring the optical pointer and the laser beam spot on the indicator with a TV camera;

separating image information of the optical pointer and the laser beam spot with a color separator connected to the TV camera;

computing position data of the optical pointer and the laser beam spot with an image processing unit connected to the color separator for outputting steering direction information and optical pointer position information, respectively;

processing a steering command with a fuzzy operation unit connected to the image processing unit using the optical pointer position information from the image processing unit;

computing a controlling command with a comparator connected to the fuzzy operation unit and the image processing unit by calculating a difference between the steering command from the fuzzy operation unit and the steering direction information from the image processing unit; and operating the steering means with the controlling command from the comparator.

5. A method for controlling travelling body according to claim 4, wherein, said steering command processing step comprises the steps of:

computing a grade value by matching antecedent membership functions of an antecedent operation unit memory of the fuzzy operation unit with the optical pointer position information;

generating reduced consequent membership functions in the fuzzy operation unit represented by two reduced triangles on a graph of an actual deviation of the laser beam spot and the quantity of displacement of the steering means by reducing the height of two triangles of consequent membership functions on the graph in a consequent operation unit memory of the fuzzy operation unit corresponding to the computed grade value;

calculating a moment of rotation of each said reduced triangles respectively using a center of gravity and the height of said reduced triangles; and combining the moments of rotation of the two reduced triangles to produce and output the steering command.

6. A system for controlling a traveling body along a predetermined route, the traveling body having a main body, steering means coupled to the main body via jacks and rods, and a driving device for the jacks, said system for controlling said traveling body comprising:

a plate-shaped indicator disposed perpendicular to an axis of the main body;

an optical pointer emitting light of a first color, said optical pointer linked with the steering means and showing the steering direction of the steering means;

a laser beam oscillator illuminating said indicator with a laser beam spot of a second color;

a TV camera monitoring said optical pointer and the laser beam spot on said indicator, a color separator connected to said TV camera, separating image information of said optical pointer and the laser beam spot;

an image processing unit, connected to said color separator, computing position data of said optical pointer and the laser beam spot for outputting steering direction information and optical pointer position information respectively;

a fuzzy operation unit, connected to said image processing unit, processing a steering command using the optical pointer position information from said image processing unit; and a comparator, connected to said fuzzy operation unit and said image processing unit, computing a controlling command for operating said steering means by calculating a difference between the steering command from said fuzzy operation unit and the steering direction information from said image processing unit.

* * * * *

UNITED STATES PATENT AND TRADEMARK OFFICE
CERTIFICATE OF CORRECTION

PATENT NO. : 5,339,241
DATED : August 16, 1994
INVENTOR(S) : ISAO FUJIMORI, et al.

It is certified that error appears in the above-indentified patent and that said Letters Patent is hereby corrected as shown below:

COLUMN 1:
    Line 18, "an" should be deleted.

COLUMN 2:
    Line 6, "operator," should read --the operator,--;
    Line 15, "An another" should read --Another--;
    Line 45, "route" should read --route,--; and
    Line 46, "body," should be deleted.

COLUMN 3:
    Line 4, "manipulated" should read --the manipulated--.

COLUMN 5:
    Line 67, "in be" should read --can be--.

COLUMN 7:
    Line 24, "DRAWING" should read --DRAWINGS--; and
    Line 26, "drawing:" should read --drawings:--.

COLUMN 8:
    Line 59, "an" should read --a--.

COLUMN 9:
    Line 33, "body 1" should read --body 1 deviating--;
    Line 34, "deviating" should be deleted; and
    Line 53, "a" should read --an--.

UNITED STATES PATENT AND TRADEMARK OFFICE
CERTIFICATE OF CORRECTION

PATENT NO. : 5,339,241
DATED : August 16, 1994
INVENTOR(S) : ISAO FUJIMORI, et al.

It is certified that error appears in the above-indentified patent and that said Letters Patent is hereby corrected as shown below:

COLUMN 10:
    Line 13, "unit 21," should read --unit 21.--;
    Line 48, "laser the" should read --the laser--; and
    Line 63, "calculted" should read --calculated--.

COLUMN 11:
    Line 27, "a" should be deleted; and
    Line 57, "exist" should read --exists--.

COLUMN 12:
    Line 35, "shows" should read --show--.

COLUMN 13:
    Line 15, "," should read --.--.

COLUMN 14:
    Line 17, "fuxzzy" should read --fuzzy--.

COLUMN 15:
    Line 57, "predetermined" should read --a predetermined--;
        and "traveling" should read --travelling--.

UNITED STATES PATENT AND TRADEMARK OFFICE
CERTIFICATE OF CORRECTION

PATENT NO. : 5,339,241
DATED : August 16, 1994
INVENTOR(S) : ISAO FUJIMORI, et al.

It is certified that error appears in the above-indentified patent and that said Letters Patent is hereby corrected as shown below:

COLUMN 16:
    Line 21, "travelling" should read --a travelling--.
    Line 22, "wherein," should read --wherein--.
    Line 44, "traveling" should read --travelling--.
    Line 45, "traveling" should read --travelling--.
    Line 48, "traveling" should read --travelling--.

Signed and Sealed this

Twenty-ninth Day of November, 1994

Attest:

BRUCE LEHMAN

Attesting Officer     Commissioner of Patents and Trademarks